United States Patent
Kimener

(10) Patent No.: US 9,656,637 B2
(45) Date of Patent: May 23, 2017

(54) TRAILER STABILIZATION AND RESTRAINT

(71) Applicant: Stabilock, LLC, Loveland, OH (US)

(72) Inventor: Thomas Terrance Kimener, Loveland, OH (US)

(73) Assignee: Stabilock, LLC, Loveland, OH (US)

( * ) Notice: Subject to any disclaimer, the term of this patent is extended or adjusted under 35 U.S.C. 154(b) by 0 days.

(21) Appl. No.: 14/754,887

(22) Filed: Jun. 30, 2015

(65) Prior Publication Data

US 2016/0001749 A1    Jan. 7, 2016

Related U.S. Application Data

(60) Provisional application No. 62/019,626, filed on Jul. 1, 2014.

(51) Int. Cl.
| | |
|---|---|
| *B60S 9/18* | (2006.01) |
| *B60S 9/04* | (2006.01) |
| *B60D 1/24* | (2006.01) |
| *B62D 53/08* | (2006.01) |
| *B60S 9/08* | (2006.01) |
| *B60D 1/66* | (2006.01) |
| *B60D 1/00* | (2006.01) |

(52) U.S. Cl.
CPC ............... *B60S 9/04* (2013.01); *B60D 1/245* (2013.01); *B60D 1/66* (2013.01); *B60S 9/08* (2013.01); *B62D 53/085* (2013.01); *B62D 53/0857* (2013.01); *B60D 2001/001* (2013.01)

(58) Field of Classification Search
CPC ................. B60S 9/12; B60S 9/14; B60S 9/20
See application file for complete search history.

(56) References Cited

U.S. PATENT DOCUMENTS

| | | | |
|---|---|---|---|
| 1,368,854 A | | 2/1921 | Steele |
| 1,475,592 A | * | 11/1923 | Morrison ................. B60S 9/08 254/133 A |
| 1,786,463 A | | 12/1930 | Thomas |
| 2,621,942 A | | 12/1952 | Getz |
| 2,754,108 A | | 7/1956 | Brown |
| 2,766,007 A | | 10/1956 | Krilanovich |
| 2,841,247 A | | 7/1958 | Smalley |
| 2,916,238 A | | 12/1959 | Fahland |
| 3,016,025 A | | 1/1962 | Deodat |
| 3,086,619 A | | 4/1963 | Grotz |

(Continued)

FOREIGN PATENT DOCUMENTS

| | | |
|---|---|---|
| CA | 1197500 | 12/1985 |
| DE | 653079 C | 11/1937 |

(Continued)

*Primary Examiner* — Lee D Wilson
(74) *Attorney, Agent, or Firm* — Willis IP LLC; Ryan Willis

(57) ABSTRACT

A parked freight trailer stabilizer and restraint comprising: (a) a kingpin receiver configured to lock onto a kingpin of a parked freight trailer; (b) a jack operatively coupled to the kingpin receiver, the jack repositionable between a retracted position and an extended position; (c) a tail hold operatively coupled to the kingpin receiver, the tail hold repositionable between a stowed position and a restraining position, the tail hold configured to engage a ground mount; and, (d) a transport receiver configured to engage a transport vehicle.

27 Claims, 4 Drawing Sheets

(56) References Cited

U.S. PATENT DOCUMENTS

| | | |
|---|---|---|
| 3,150,729 A | 9/1964 | Mehki |
| 3,169,012 A | 2/1965 | Fagan |
| 3,183,854 A | 5/1965 | Candlin, Jr. et al. |
| 3,189,322 A | 6/1965 | Hadek |
| 3,234,893 A | 2/1966 | Sweda |
| 3,235,211 A | 2/1966 | Robinson et al. |
| 3,250,506 A | 5/1966 | Thouvenelle et al. |
| 3,254,900 A | 6/1966 | Lee |
| 3,291,234 A | 12/1966 | Woodburn |
| 3,305,049 A | 2/1967 | Willey |
| 3,348,502 A | 10/1967 | Burns et al. |
| 3,362,353 A | 1/1968 | Johnson et al. |
| 3,392,944 A | 7/1968 | Wyrough |
| 3,403,487 A | 10/1968 | Docter |
| 3,486,768 A | 12/1969 | Masser |
| 3,504,880 A | 4/1970 | Toms |
| 3,521,902 A | 7/1970 | Akers |
| 3,523,698 A | 8/1970 | Bishop |
| 3,542,157 A | 11/1970 | Noah |
| 3,556,481 A | 1/1971 | Mueller et al. |
| 3,589,748 A | 6/1971 | Miller |
| 3,625,531 A | 12/1971 | Ranzenhofer |
| 3,657,695 A | 4/1972 | Birmingham |
| 3,669,409 A | 6/1972 | Eranosian |
| 3,693,145 A | 9/1972 | Mize |
| 3,698,730 A | 10/1972 | Hansen |
| 3,787,030 A | 1/1974 | Bieker |
| 3,793,787 A | 2/1974 | Shidaker et al. |
| 3,824,536 A | 7/1974 | Cherico |
| 3,836,179 A | 9/1974 | Jennings |
| 3,949,822 A | 4/1976 | English |
| 3,950,811 A | 4/1976 | Larson |
| 3,995,876 A | 12/1976 | Ronne |
| 3,999,427 A | 12/1976 | Decker |
| 4,002,215 A | 1/1977 | Harvill |
| 4,012,172 A | 3/1977 | Schwaar et al. |
| 4,023,649 A | 5/1977 | Wood |
| 4,037,822 A | 7/1977 | Barcella |
| 4,067,543 A | 1/1978 | Orth et al. |
| 4,084,789 A * | 4/1978 | Francis .................... B66F 1/06 254/418 |
| 4,097,840 A | 6/1978 | Chappelle |
| 4,099,695 A | 7/1978 | Shinn, Jr. |
| 4,113,065 A | 9/1978 | Sikli |
| 4,127,856 A | 11/1978 | Bickel |
| 4,199,168 A | 4/1980 | Bush et al. |
| 4,223,767 A | 9/1980 | Powell |
| 4,254,532 A | 3/1981 | Hager |
| 4,255,120 A | 3/1981 | Straitz, III |
| 4,261,682 A | 4/1981 | Papps et al. |
| 4,354,580 A | 10/1982 | Delasantos et al. |
| 4,366,965 A | 1/1983 | Rhodes |
| 4,397,594 A | 8/1983 | Hammonds et al. |
| 4,452,147 A | 6/1984 | Jwuc |
| 4,456,084 A | 6/1984 | Miller |
| 4,456,278 A | 6/1984 | Chapman |
| 4,456,413 A | 6/1984 | Pavlick |
| 522,993 A | 7/1984 | Lobee |
| 4,462,569 A | 7/1984 | Arzouman |
| 306,581 A | 10/1984 | Chase |
| 4,524,699 A | 6/1985 | Pavlick |
| 4,547,107 A | 10/1985 | Krause |
| 4,573,663 A | 3/1986 | Nussbaum |
| 4,582,176 A | 4/1986 | Roberts |
| 4,636,119 A | 1/1987 | Terlecky |
| 4,671,714 A | 6/1987 | Bennett |
| 4,674,929 A | 6/1987 | Blunden |
| 4,676,344 A | 6/1987 | Locicero |
| 4,712,653 A | 12/1987 | Franklin et al. |
| 4,718,800 A | 1/1988 | Engle |
| 4,724,930 A | 2/1988 | Vanlierop |
| 4,743,150 A | 5/1988 | Hlinsky |
| 4,822,004 A | 4/1989 | Van Lierop |
| 4,830,563 A | 5/1989 | Yeakle |
| 4,858,888 A | 8/1989 | Cruz et al. |
| 4,865,295 A | 9/1989 | Holloway |
| 4,874,184 A | 10/1989 | Boyer |
| 4,921,074 A | 5/1990 | Ochs |
| 4,938,648 A | 7/1990 | Horan |
| 4,969,112 A | 11/1990 | Castle |
| 4,973,206 A | 11/1990 | Engle |
| 5,013,011 A | 5/1991 | Halloway |
| 5,015,131 A | 5/1991 | Schmidt et al. |
| 5,017,064 A | 5/1991 | Kirwan et al. |
| 5,017,065 A | 5/1991 | Krug et al. |
| 5,020,445 A | 6/1991 | Adams, Jr. |
| 5,026,229 A | 6/1991 | Matyas et al. |
| 5,048,896 A | 9/1991 | Channell |
| 5,052,868 A | 10/1991 | Hesch et al. |
| 5,059,072 A | 10/1991 | Holt |
| 5,090,720 A | 2/1992 | Heider et al. |
| 5,100,105 A | 3/1992 | Schneider et al. |
| 5,107,772 A | 4/1992 | Viens |
| 5,112,172 A | 5/1992 | Engle |
| 5,118,082 A | 6/1992 | Byan |
| 5,137,297 A | 8/1992 | Walker |
| 5,139,102 A | 8/1992 | Pocapalia |
| 5,215,344 A | 6/1993 | Augustyniak |
| 5,224,311 A | 7/1993 | Pearce |
| 5,249,905 A | 10/1993 | Warner et al. |
| 5,291,835 A | 3/1994 | Wicks |
| 5,305,496 A | 4/1994 | Gagnon |
| 5,322,143 A | 6/1994 | Curran |
| 5,340,082 A | 8/1994 | Holloway |
| 5,348,331 A | 9/1994 | Hawkins |
| 5,407,221 A | 4/1995 | Haire et al. |
| 5,407,309 A | 4/1995 | Hesch et al. |
| 5,433,578 A | 7/1995 | Honan |
| 5,452,982 A | 9/1995 | Engle |
| 5,490,748 A | 2/1996 | Hapeman |
| 5,518,354 A | 5/1996 | Engle |
| 5,531,559 A | 7/1996 | Kruzick |
| 5,553,987 A | 9/1996 | Ellis |
| 5,575,604 A | 11/1996 | Dubosh et al. |
| 5,582,498 A | 12/1996 | Springer et al. |
| 5,662,450 A | 9/1997 | Roberts |
| 5,709,518 A | 1/1998 | Alexander et al. |
| 5,743,697 A | 4/1998 | Alexander |
| 5,757,528 A | 5/1998 | Bradley et al. |
| 5,762,459 A | 6/1998 | Springer et al. |
| 5,808,769 A | 9/1998 | Kerklaan et al. |
| 5,868,379 A | 2/1999 | Ellis |
| 5,934,857 A | 8/1999 | Alexander |
| 6,082,952 A | 7/2000 | Alexander |
| 6,089,544 A | 7/2000 | Ellis |
| 6,091,764 A | 7/2000 | Silk et al. |
| 6,092,970 A | 7/2000 | Hahn et al. |
| 6,144,888 A | 11/2000 | Lucas et al. |
| 6,168,360 B1 | 1/2001 | Knox |
| 6,250,432 B1 | 6/2001 | Hageman et al. |
| 6,250,650 B1 | 6/2001 | Douglas |
| 6,309,165 B1 | 10/2001 | Hahn et al. |
| 6,318,947 B1 | 11/2001 | Hahn et al. |
| 6,336,527 B1 | 1/2002 | Metz |
| 6,357,987 B1 | 3/2002 | Palus |
| 6,368,043 B1 | 4/2002 | Leum et al. |
| 6,396,408 B2 | 5/2002 | Drummond et al. |
| 6,481,739 B1 | 11/2002 | Newkirk |
| 6,505,713 B1 | 1/2003 | Paul et al. |
| 6,520,472 B1 | 2/2003 | Manich et al. |
| 6,524,053 B2 | 2/2003 | Hahn et al. |
| 6,589,003 B2 | 7/2003 | Berends |
| 6,739,611 B2 | 5/2004 | Gisinger et al. |
| 6,755,433 B2 | 6/2004 | Krauss |
| 6,773,221 B2 | 8/2004 | Belongia et al. |
| 6,896,289 B2 | 5/2005 | Gross |
| 6,948,587 B2 | 9/2005 | Griffiths |
| 6,951,345 B2 | 10/2005 | Wilks |
| 7,226,265 B2 | 6/2007 | Wilson |
| 7,232,282 B2 | 6/2007 | Engle |
| 7,235,896 B2 | 6/2007 | Olijnyk |
| 7,264,092 B2 | 9/2007 | Jette |
| 7,270,201 B1 | 9/2007 | Cryer |

(56) References Cited

U.S. PATENT DOCUMENTS

| | | | |
|---|---|---|---|
| 7,296,784 B2 * | 11/2007 | Peter | B60S 9/12 254/418 |
| 7,413,172 B2 | 8/2008 | Kanzler et al. | |
| 8,286,997 B2 | 10/2012 | Kimener | |
| 8,528,929 B2 | 9/2013 | Kimener | |
| 8,567,820 B2 | 10/2013 | Kimener | |
| 8,789,850 B2 | 7/2014 | Kimener | |
| 9,221,630 B2 | 12/2015 | Kimener | |
| 2001/0022731 A1 | 9/2001 | Dupay | |
| 2005/0133315 A1 | 6/2005 | Hoofard | |
| 2006/0082100 A1 | 4/2006 | Gross et al. | |
| 2006/0145460 A1 | 7/2006 | Eriksson | |
| 2007/0040353 A1 | 2/2007 | Dallaire et al. | |
| 2007/0050999 A1 | 3/2007 | Milner et al. | |
| 2007/0252358 A1 | 11/2007 | Cunefare et al. | |
| 2007/0290482 A1 | 12/2007 | Schak | |
| 2008/0095598 A1 | 4/2008 | Cotton et al. | |
| 2009/0283999 A1 | 11/2009 | Andersen et al. | |
| 2010/0266375 A1 | 10/2010 | Ion | |
| 2011/0158778 A1 | 6/2011 | Harrington | |
| 2016/0001749 A1 * | 1/2016 | Kimener | B60S 9/08 414/800 |

FOREIGN PATENT DOCUMENTS

| | | |
|---|---|---|
| DE | 3425498 | 3/1985 |
| EP | 0510372 | 3/1992 |
| EP | 0510372 | 10/1994 |
| EP | 0510467 | 11/1994 |
| FR | 1334344 | 8/1963 |
| FR | 2636717 | 3/1990 |
| GB | 927806 | 6/1963 |
| GB | 2237329 | 5/1991 |
| WO | 9009339 | 8/1990 |
| WO | PCT/US2011/037260 | 10/2011 |
| WO | WO2011/146787 | 11/2011 |
| WO | PCT/US2011/037260 | 11/2012 |

* cited by examiner

TRAILER STABILIZATION AND RESTRAINT

CROSS REFERENCE TO RELATED APPLICATIONS

The present application claims the benefit of U.S. Provisional Patent Application Ser. No. 62/019,626, titled, "TRAILER STABILIZATION AND RESTRAINT," filed Jul. 1, 2014, the disclosure of which is incorporated herein by reference.

RELATED ART

Field of the Invention

The present disclosure is directed to devices and methods utilized to stabilize and restrain parked freight trailers at a loading dock untethered to a tractor.

Introduction to the Invention

It is a first aspect of the present invention to provide a parked freight trailer stabilizer and restraint comprising: (a) a kingpin receiver configured to lock onto a kingpin of a parked freight trailer; (b) a jack operatively coupled to the kingpin receiver, the jack repositionable between a retracted position and an extended position; (c) a tail hold operatively coupled to the kingpin receiver, the tail hold repositionable between a stowed position and a restraining position, the tail hold configured to engage a ground mount; and (d) a transport receiver configured to engage a transport vehicle.

In a more detailed embodiment of the first aspect, the jack comprises at least two spaced apart jacks that are coupled to the kingpin receiver, where each of the at least two jacks is repositionable between the retracted position and the extended position. In yet another more detailed embodiment, the freight trailer stabilizer further includes a frame mounted to the at least two spaced apart jacks. In a further detailed embodiment, the tail hold is repositionably mounted to at least one of the frame, the kingpin receiver, and the at least two spaced apart jacks. In still a further detailed embodiment, the jack is manually repositionable between the retracted position and the extended position. In a more detailed embodiment, the jack is automatically repositionable between the retracted position and the extended position. In a more detailed embodiment, the transport receiver comprises a pair of fork receivers, each of the pair of fork receivers configured to receive a separate fork associated with the transport vehicle. In another more detailed embodiment, each of the pair of fork receivers comprises at least one of a hollow tube, a plurality of straps, a plurality of discontinuous bands. In yet another more detailed embodiment, the tail hold includes at least one of a bar and a hook that is configured to be mounted to the ground mount when in a restraining position, wherein the ground mount is permanently mounted to the ground. In still another more detailed embodiment, the catch comprises a floating bar mounted to a frame of the tail hold, the floating bar configured to engage the ground mount when in a restraining position, wherein the ground mount is permanently mounted to the ground.

In yet another more detailed embodiment of the first aspect, the jack includes a first handle that is rotationally repositionable to reposition the jack between the retracted position and the extended position, and the tail hold includes a second handle that is rotationally repositionable to reposition the tail hold between the stowed position and the restraining position. In yet another more detailed embodiment, the king pin receiver comprises a fifth wheel, the jack comprises at least two jacks spaced apart from one another, the tail hold includes a connector adapted to engage the ground mount in a restraining position, and the at least two jacks are freight trailer load bearing jacks. In a further detailed embodiment, the tail hold is pivotally mounted to at least one of the fifth wheel and the at least two jacks, the at least two jacks are at least one of manually and automatically repositionable, and the transport receiver comprises a pair of receivers, each of the pair of receivers configured to receive a projection of the transport vehicle.

It is a second aspect of the present invention to provide a method of stabilizing and/or restraining a parked freight trailer, the method comprising: (a) lifting a trailer stabilizing device to engage a parked freight trailer, where at least a portion of the trailer stabilizing device is suspended above the ground from a forward portion of the parked freight trailer after engaging the parked freight trailer; and, (b) repositioning a portion of the trailer stabilizing device to couple to the ground after engaging the trailer stabilizing device to the parked freight trailer.

In a more detailed embodiment of the second aspect, lifting the trailer stabilizing device to engage the parked freight trailer includes locking onto a kingpin of the parked freight trailer and suspending at least the portion of the trailer stabilizing device above the ground over a footprint of the kingpin. In yet another more detailed embodiment, lifting the trailer stabilizing device to engage the parked freight trailer includes hanging a jack from the parked freight trailer so the jack is elevated above the ground in a hanging position. In a further detailed embodiment, repositioning a portion of the trailer stabilizing device includes repositioning the jack from the hanging position to a ground mounting position where the jack engages the ground and assumes a load bearing capacity. In still a further detailed embodiment, the jack comprises a plurality of jacks, and repositioning the plurality of jacks from the hanging position to the ground mounting position includes at least one of automatically and manually repositioning the plurality of jacks from the hanging position to the ground mounting position. In a more detailed embodiment, lifting the trailer stabilizing device to engage the parked freight trailer includes hanging a tether from the parked freight trailer so the tether is elevated above the ground in a unengaged position. In a more detailed embodiment, repositioning a portion of the trailer stabilizing device includes repositioning the tether from the unengaged position to an engaged position where the tether is concurrently operatively coupled to the ground and the forward portion of the parked freight trailer. In another more detailed embodiment, the tether includes a tail hold, and repositioning the tail hold from the unengaged position to the engaged position includes at least one of automatically and manually repositioning the tail hold.

It is a third aspect of the present invention to provide a method of stabilizing and/or restraining a parked freight trailer, the method comprising: (a) repositioning an elevated trailer stabilizing device into engagement with a parked freight trailer, the trailer stabilizing device including a repositionable jack; and, (b) repositioning the repositionable jack to wedge the stabilizing device between the parked freight trailer and the ground.

In a more detailed embodiment of the third aspect, the method does not include extension or retraction of landing gear of the parked freight trailer. In yet another more detailed embodiment, the trailer stabilizing device further includes a repositionable tail hold, and the method further includes repositioning the tail hold to engage a ground mount. In a further detailed embodiment, the method does not include extension or retraction of landing gear of the parked freight trailer. In still a further detailed embodiment, the trailer stabilizing device further includes a repositionable tail hold, and repositioning the trailer stabilizing device into engagement with a parked freight trailer include moving the tail hold across the ground. In a more detailed embodiment, repositioning the elevated trailer stabilizing device into engagement with the parked freight trailer includes utilizing a forklift to reposition the elevated trailer stabilizing device. In a more detailed embodiment, the trailer stabilizing device further includes a repositionable tail hold, and the repositionable tail hold includes a metal frame repositionable with respect to the repositionable jack. In another more detailed embodiment, repositioning an elevated trailer stabilizing device into engagement with a parked freight trailer includes locking onto a kingpin of the parked freight trailer and suspending at least the portion of the trailer stabilizing device above the ground over a footprint of the kingpin. In yet another more detailed embodiment, the method further includes at least maintaining a height of forward portion of the parked freight trailer after repositioning the repositionable jack to wedge the stabilizing device between the parked freight trailer and the ground.

DETAILED DESCRIPTION

The exemplary embodiments of the present disclosure are described and illustrated below to encompass devices and methods utilized to stabilize and restrain parked freight trailers at a loading dock untethered to a tractor. Of course, it will be apparent to those of ordinary skill in the art that the embodiments discussed below are exemplary in nature and may be reconfigured without departing from the scope and spirit of the present invention. However, for clarity and precision, the exemplary embodiments as discussed below may include optional steps, methods, and features that one of ordinary skill should recognize as not being a requisite to fall within the scope of the present invention.

Figure 1:
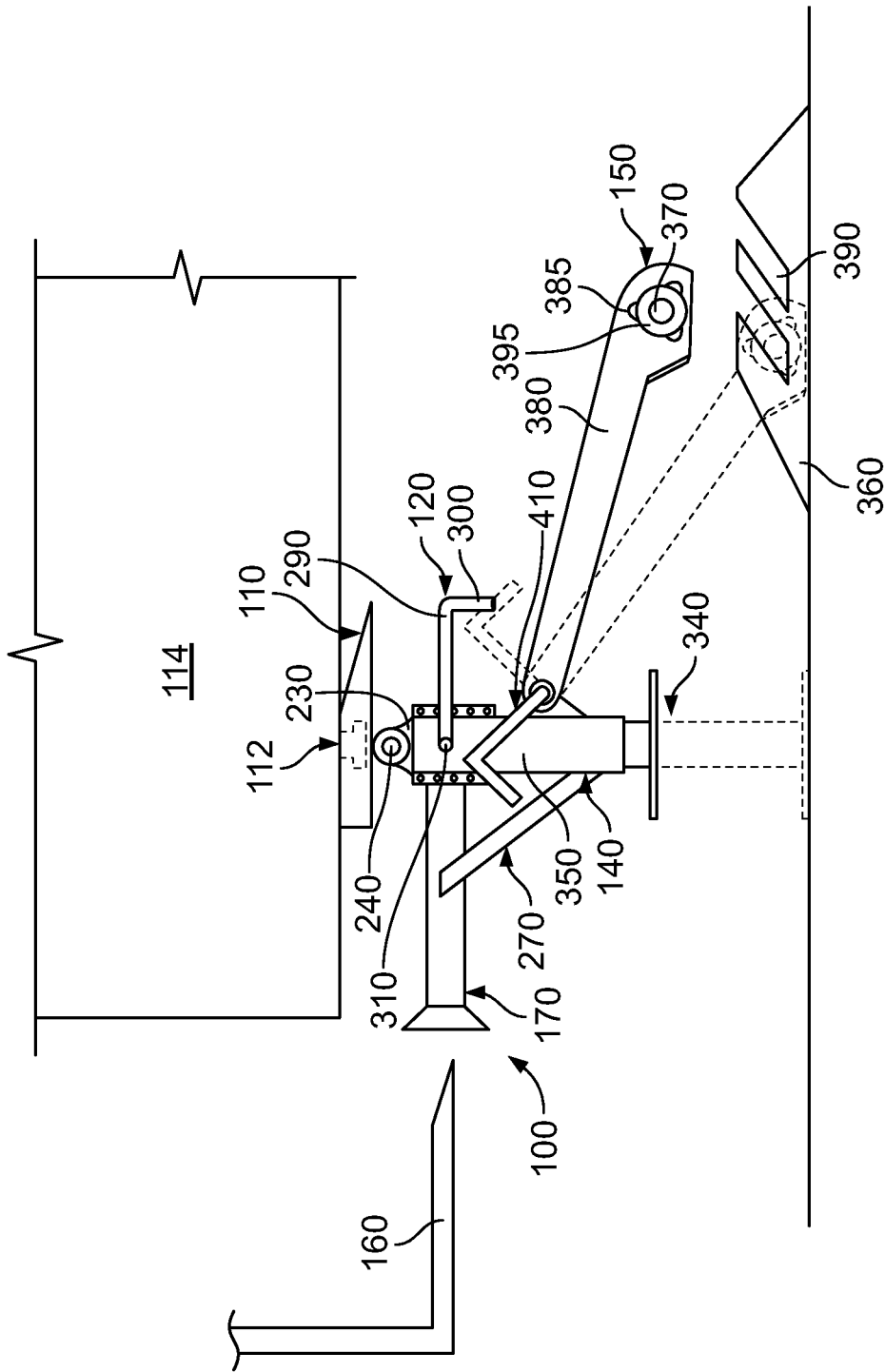
FIG. 1 is a profile view of a first exemplary trailer stabilizer in accordance with the present disclosure being mounted to a parked freight trailer.
Figure 2:
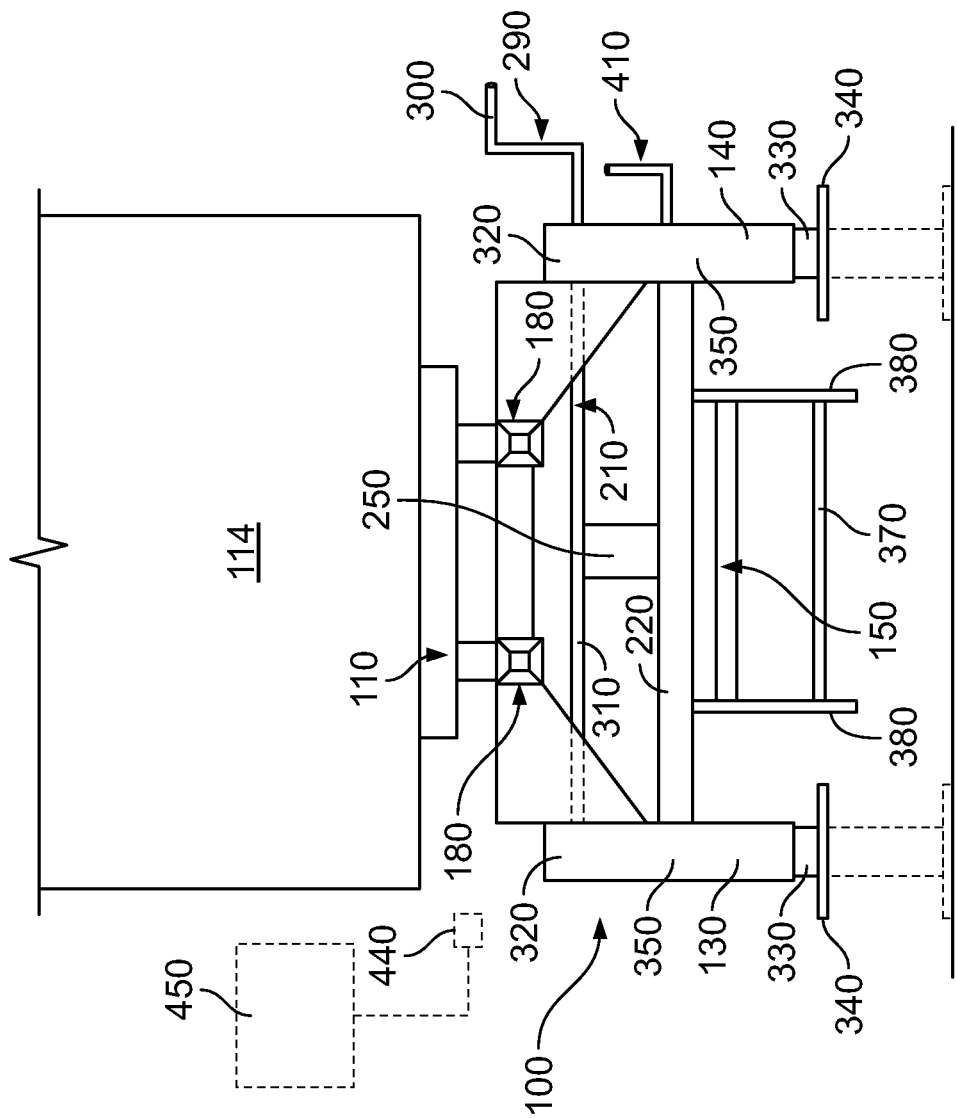
FIG. 2 is a frontal view of the first exemplary trailer stabilizer of FIG. 1 being mounted to a parked freight trailer.
Figure 3:
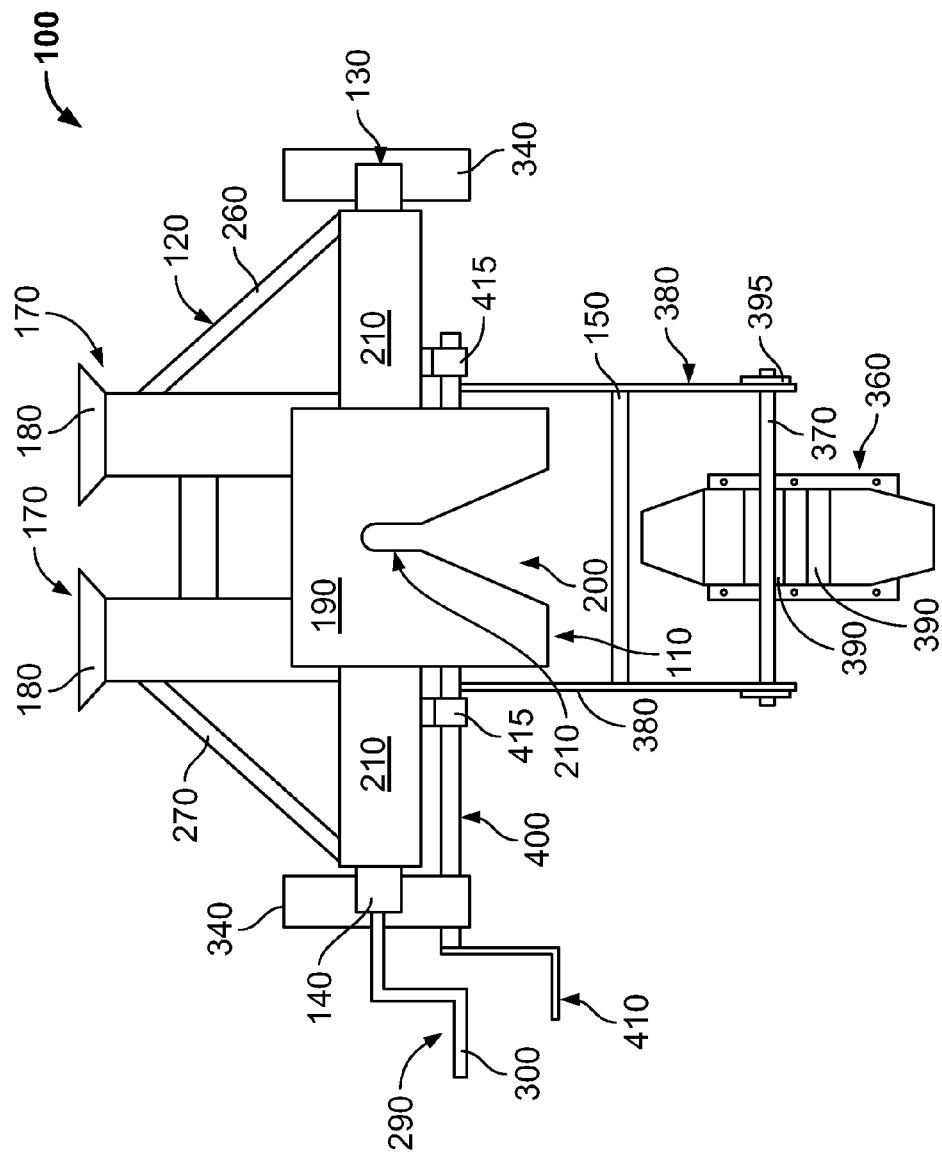
FIG. 3 is a top view the first exemplary trailer stabilizer of FIG. 1.

Referencing FIGS. 1-3, a first exemplary trailer restraint and stabilizing device 100 includes a fifth wheel 110 that is repositionably mounted to a compact frame 120. The fifth wheel 110 is configured to engage the kingpin 112 of a parked freight trailer 114, presumably at a loading dock or other loading/unloading facility. The compact frame 120 of the device 100 is also mounted to a pair of repositionable jacks 130, 140 and a repositionable tail hold 150, where the device 100 is configured to be repositioned using a pair of forks 160 that are received within deployment tubes 170. In exemplary form, the pair of forks 160 may be associated with a forklift (not shown) or other repositionable vehicle that has vertically repositionable forks. As described herein, in exemplary form, a forklift will be described as the vehicle utilized to position the device 100 with respect to the parked freight trailer 114. Those skilled in the art are familiar with the structure of a freight trailer 114, the engagement between a fifth wheel 110 and kingpin 112, and the structure of a loading/unloading facility, including elevated mezzanines. Accordingly, a detailed discussion of freight trailers 114, kingpins 112, fifth wheels 110, loading/unloading facilities, and associated structures has been omitted in furtherance of brevity.

In this exemplary embodiment, the device 100 may be repositioned by a forklift or other repositionable vehicle. By way of example, the device 100 may initially be positioned at a stand-by location of a loading/unloading facility remote from the parked freight trailers 114. In order to reposition the device 100, the forklift engages its forks 160 with the deployment tubes 170. In exemplary form, the forklift may align its forks 160 with the deployment tubes 170 so that the tapered end of the forks is received within corresponding funnel-shaped receivers 180 that are operative to direct the forks into corresponding deployment tubes. The funnel-shaped receivers 180 embody a hollow, rectangular frustro-pyramidal shape that is mounted to an end of the deployment tubes 170. In this exemplary embodiment, the smallest rectangular cross-section of the funnel-shaped receivers 180 corresponds to the rectangular cross-section of the hollow deployment tubes 170, which is substantially constant along the longitudinal length of the deployment tubes. In this exemplary embodiment, both the funnel-shaped receivers 180 and the deployment tubes 170 are fabricated from metal, such as steel rectangular tube (for the deployment tubes) and welded metal sheet stock (for the funnel-shaped receivers). It should also be noted that the deployment tubes need not be closed tubes 170. Rather, the exemplary embodiment may make use of loops, C-shaped retainers, or strapped loops to allow engagement and selective retention between the forks 160 and the device 100. After positioning the forks 160 within the deployment tubes 170, the forklift may raise the forks to elevate the device 100 off the ground. In this elevated position, the device 100 may be repositioned into engagement with a freight trailer 114.

In exemplary form, the forklift may approach the front of a parked freight trailer 114, which is supported by its rear axle(s) at a rearward portion and lowered landing gear (not shown) at a frontal portion. It is presumed that an area below the front of the freight trailer 114 where the kingpin 112 is located is unobstructed so as to allow the forklift to reposition the device 100 to engage the kingpin 112. It should be noted, however, that engagement between the device 100 and the kingpin 112 is not necessary in order to restrain and/or stabilize the parked freight trailer 114. By way of example when repositioning the device 100, the height of the forks 160 is adjusted to maintain suspension of the device 100 above the ground while at the same time vertically aligning the fifth wheel 110 with the kingpin 112 so that movement of the forklift, and correspondingly the forks 160, toward the front of the freight trailer 114 will cause the fifth wheel to correspondingly align, engage, and lock onto the kingpin.

In this exemplary embodiment, the fifth wheel 110 includes a substantially flat top plate 190 lubricated to engage an underside surface of the freight trailer 114. In order to increase the likelihood that the kingpin 112 is captured and locked into engagement with the fifth wheel 110, an opening 200 is formed into a distal portion of the top plate that is tapered on opposing sides. This tapering provides a relatively wide opening 200 at the distal end that is many times the width of a kingpin 112, but narrows gradually to reach a constant width section 210 that is enclosed at a proximal end. The tapered shape of the fifth wheel opening 200 is operative to funnel the kingpin 112 into the constant width section 210, where the kingpin is locked into engagement with the fifth wheel 110 and device 100 using a pair of locking jaws (not shown). After the locking jaws are engaged, the device 100 is mounted to the kingpin 112 so that proximal-to-distal movement of the fifth wheel 110 with respect to the freight trailer 114 is very limited (it is simply the amount of travel provided for between the fifth wheel 110 and kingpin 112). Moreover, at this time, the forks 160 of the forklift are no longer needed to support the weight of the device 100 above the ground given that the engagement between the fifth wheel 110 and the kingpin 112 allows the device to hang from the kingpin. Accordingly, the forklift forks 160 may be removed from the deployment tubes 170 after the fifth wheel 110 engages the kingpin 112 by repositioning the forklift away from the front of the freight trailer 114 and, accordingly, withdrawing the forks 160 from the deployment tubes 170 to discontinue engagement between the device 100 and forklift when no power is utilized from the forklift. As will be discussed in more detail hereafter, alternate exemplary embodiments provide for powered repositionable jacks and a powered repositionable tail hold that utilize power on-board the forklift and, accordingly, provide for extended engagement between the forklift and the trailer stabilizing device 100 until the jacks and tail hold are repositioned to a stabilized and restrained position.

In circumstances where the device 100 includes manually repositionable jacks 130, 140 and a manually repositionable tail hold 150, disengagement between the forklift and the device 100 is optional before repositioning the jacks and tail hold from a storage position (e.g., transportation position) to a stabilized and restrained position (e.g., deployment position). As used herein, the terms storage position or transport position with respect to the jacks and tail hold refers to a position, within an available a range of motion, where the jacks and tail hold do not retard repositioning of the device 100. In contrast, a stabilized or restrained position or a deployment position, as used herein with respect to the jacks and tail hold, refers to a position, within an available range of motion, where the jacks and/or the tail hold retard repositioning of the device 100 with respect to the freight trailer 114.

It is presumed that when the device 100 is initially secured to the kingpin 112 of the freight trailer that the jacks 130, 140 and tail hold 150 occupy a storage position. In this exemplary embodiment, the storage position may include the jacks 130, 140 being fully retracted within a range of motion ranging from the jacks being fully retracted and being fully extended. Similarly, the storage position may include the tail hold 150 being fully elevated within a range of motion ranging from the tail hold being fully elevated and being fully lowered. But after engagement between the kingpin 112 and fifth wheel 110, the jacks 130, 140 and tail hold 150 may be repositioned to a stabilized and restrained position.

Repositioning the jacks 130, 140 to a stabilized and restrained position results in the jacks bearing at least a portion of the forward weight of the parked freight trailer 114. As part of accomplishing this weight bearing function, the compact frame 120 includes an upper cross-member 210 and a lower cross-member 220 that are mounted to and span between the jacks 130, 140. In exemplary form, the cross-members 210, 220 comprise rectangular tubular steel that may be welded or coupled via fasteners (e.g., nuts and bolts) to the jacks 130, 140.

Centered on top of the upper cross-member 210 and mounted thereto is a foot plate 230, to which the fifth wheel 110 is pivotally mounted by way of pivot pins 240 concurrently extending through the fifth wheel and foot plate. In this exemplary embodiment, the foot plate 230 may be welded or coupled with fasteners (e.g., nuts and bolts) to the upper cross-member 210. It should be noted that other coupling devices may be utilized in lieu of a fifth wheel 110 in order to mount the device 100 to the kingpin 112 and allow the device to hang from the kingpin such as, without limitation, a kingpin lock.

Positioned beneath the foot plate 230 and interposing the cross-members 210, 220 is a vertical support 250 that spans the vertical distance between the cross-members. The vertical support 250 may be welded or coupled with fasteners (e.g., nuts and bolts) and comprises rectangular tubular steel. This vertical support also interposes the deployment tubes 170, which are mounted to the underside of the upper cross-member 210.

In exemplary form, the deployment tubes 170 are welded to the upper cross-member 210 and are spaced apart in the widthwise direction approximately the width of the fifth wheel top plate 190. Moreover, the deployment tubes 170 are oriented parallel to one another and terminate distally at a distal edge of the upper cross-member 210. The deployment tubes 170 extend proximally a predetermined distance sufficient to terminate proximate a front plane of the freight trailer 114. Alternatively, the deployment tubes may terminate prior to the front plane of the freight trailer 114 or extend proximally beyond the front of the freight trailer. The predetermined distance should allow the forks 160 to be received within the deployment tubes 170 and provide for the forks to support the weight of the device 100 and position the device sufficiently deep underneath the freight trailer 114 for the fifth wheel 110 to engage the trailer king pin 112.

In order to provide lateral support, the compact frame 120 includes left and right sway bars 260, 270 that interpose the deployment tubes 170 and the jacks 130, 140. In particular, the sway bars 260, 270 may be welded to the deployment tubes 170 and to the jacks 130, 140 just above the lower cross-member 220. Exemplary sway bars 260, 270 may be fabricated from rectangular metal tubing. Given that the sway bars 260, 270 are not intended to be load bearing, these bars may be fabricated from lighter weight structures that those of the cross-members 210, 220 and vertical support 250.

In this exemplary embodiment, repositioning the jacks 130, 140 to a stabilized or restrained position may be accomplished by manually repositioning a crank 290 that is mechanically coupled to each jack. By way of example, the crank 290 includes a crank handle 300 and a crank shaft 310 that engages internal gears (not shown) inside the jack housings 320 of the respective jacks 130, 140. Rotation of the crank handle 300 transfers this rotational motion to the crank shaft 310 that transfers its rotational motion to the gears coupled to a screw in order to vertically extend a repositionable leg 330 and ground pad 340 with respect to a fixed position jack housing 350. Exemplary jacks for use with this embodiment include, without limitation, the Holland Mark V Series available from SAF-HOLLAND USA, Inc., (Muskegon, Mich., USA) and the HD 2-Speed Tandem Landing Gear available from Cequent Performance Products (Plymouth, Mich., USA). It is presumed that the jacks 130, 140 would be located in the storage position prior to being repositioned to the stabilizing and restraining position, however, the jacks may be in other positions than in a load bearing position with the ground pad 340 in contact with the ground. In any event, the crank handle 300 is rotated to reposition the leg 330 and pad 340 so that the pad contacts the ground. In particular, the crank handle 300 may be rotated until the jacks 130, 140 take on a load bearing position in order to supplement or assume the weight bearing function of the landing gear of the freight trailer 114. While the jacks 130, 140 are intended to take on a load bearing function, it should be noted that the jacks may be repositioned to bear some or all of the forward weight of the freight trailer 114. In either circumstance, the landing gear of the freight trailer 114 may be optionally manipulated to reach the appropriate balance (to the extent a shared weight bearing distribution between the landing gear and device is intended). In addition to repositioning the jacks 130, 140 to take on a load or weight bearing function, the tail hold 150 may also be repositioned.

In this exemplary embodiment, the tail hold 150 is manually repositioned to engage a permanent ground mount 360, thereby providing restraint against forward movement of the freight trailer 114 (e.g., movement away from a loading dock). By way of example, the tail hold 150 comprises a lateral bar 370 (with or without a hook) mounted to and extending between parallel arms 380. In exemplary form, the lateral bar 370 comprises cylindrical metal tubing that is received within corresponding oversized openings 385 (e.g., a circular, triangular, rectangular, oblong oval, etc.) extending through the arms 380. The lateral ends of the bar 370 have mounted thereto endcaps 395 that prohibit lateral removal of the bar through the openings 385 of the arms 380, but continue to allow the bar 370 vertical and proximal-to-distal play to better facilitate the bar being secured within one of the spaced apart cavities of the lock box 360. Each of the arms 380 is mounted to a cylindrical rod 400 that is operatively coupled to a handle 410, where the rod 400 engages bearings 415 that are coupled to the frame 120. Repositioning the handle 410 in a rotating motion is operative to correspondingly rotate the rod 400. Rotation of the rod 400 causes the arms 380 and bar 370 to rotate along a predetermined arcuate path (see FIG. 1) operative to either move the bar 370 farther away or closer to the ground mount 360 (i.e., raise or lower the bar 370).

The ground mount 360 may comprise a lock box permanently mounted to the ground that includes a series of spaced apart cavities 390, with at least one of the cavities receiving the bar 370 in order to retain the bar within the cavity until it is removed via rotation of the handle 410 and rod 400. In exemplary form, the cavities 390 are spaced apart in a predetermined fashion that corresponds to common freight trailer lengths (28, 48 feet length freight trailers) to accommodate for various kingpin 112 setback lengths (12, 24, 30, and 36 inch setbacks) from the front of the freight trailer 114. The perimeter of the ground mount 360 may include four or more sides that may be mounted to one another in a frustropyramidal shape to provide inclined surfaces that allow for objects to contact and ride over the ground mount (e.g., snow blades to ride thereover when plowing).

After engagement between the kingpin 112 and fifth wheel 110, the tail hold 150 may be repositioned to a stabilized and restrained position. In exemplary form, the tail hold 150 occupies a storage position during the process of engagement between the kingpin 112 and fifth wheel 110 (see FIG. 1). But after engagement between the kingpin 112 and fifth wheel 110 is complete, the tail hold 150 may be repositioned to a stabilized and restrained position where the tail hold 150 is operative to retard forward movement of the trailer away from the loading dock (see FIG. 2). In order to reposition the tail hold 150, than handle 410 is rotated in order to rotate the rod 400, which in turn is operative to rotate the arms 380 so the arms approach the ground mount 360. Continued rotation of the handle 410 eventually brings the bar 370 into contact with the ground mount 360, preferably orienting the bar within one of the cavities 390. In circumstances where the bar 370 does not precisely align with one of the cavities 390, an operator may manually reposition the bar 370 into the nearest cavity 390 using the play between the bar and arms 380. Eventually, the bar 370 is aligned with one of the cavities 390 and further rotation of the tail hold 50 causes the bar to become seated at the bottom of a respective cavity (see FIG. 1).

The ground mount 360 may include a locking feature other than the shape of the cavity to retain the bar 370 therein, but if the shape of the cavities approximates the arcuate path taken by the bar 370 when lowered there may not be an additional lock to retain the bar 370 within the ground mount 360. In any event, retention of the bar 370 with respect to the ground mount 360 is operative to restrict movement of the arms 380 away from the ground mount. Because the arms 380 are secured to the device 100, which is secured to the freight trailer 114, the result of retention of the bar 370 within the ground mount 360 is restraint of the freight trailer against forward movement (i.e., movement of the freight trailer away from the loading dock).

It should be understood, however, that the jacks 130, 140 and tail hold 150 may be repositioned to a stabilized and restrained position at the same time or sequentially in any order. Moreover, in certain circumstances, the jacks 130, 140 may be repositioned to stabilized and restrained position while the tail hold 150 remains in a storage position while the kingpin 112 and fifth wheel 110 remain engaged. Conversely, the tail hold 150 may be repositioned to the stabilized and restrained position while the jacks 130, 140 remain in a storage position and while the kingpin 112 and fifth wheel 110 remain engaged.

After the jacks 130, 140 and/or the tail hold 150 is deployed to engage the ground, the freight trailer 114 may be loaded or unloaded. In order to inform personnel working within the loading dock that the trailer stabilizing device 100 is properly in position to restrain and/or support the freight trailer 114, it is within the scope of the disclosure to mount one or more video cameras 440 to the exterior of the loading dock that are communicatively coupled to one or more displays 450 on the interior of the loading dock in order to provide visual feedback as to the position of the trailer stabilizing device.

After loading or unloading, the process may be reversed to remove the trailer stabilizer 100 from the parked freight trailer 114 in order to allow coupling of the freight trailer to an over-the-road truck or a hustler truck. The process, while not requiring any specific sequence of steps, is preferably carried out to raise/disengage the tail hold 150 first, followed by raising of the jacks 130, 140, followed by coupling the device to a portable vehicle in order to support the device and allow disengagement between the fifth wheel 110 and kingpin 112, which when completed allows the device to be removed from underneath the freight trailer. A more detailed exemplary process for utilizing the device 100 follows.

Initially, a transport vehicle (e.g., a forklift) engages the device 100 and an operator of the transport vehicle ensures that the components of the device are in a transport position. In exemplary form, the transport vehicle engages the device 100 in order to allow the transport vehicle to carry the device. Presuming the device 100 is positioned on the ground at a location remote from a freight trailer 114, an outside dock worker/operator of the transport vehicle may reposition a set of forks 160 to be received within corresponding deployment tubes 170 or other fork receiving structures. By way of example, the forks 160 are received deep enough within the deployment tubes 170 so that by raising the forks vertically, the device 100 is correspondingly raised vertically. At a time prior to, during, or subsequent to reception of the forks 160 within the deployment tubes 170, the operator of the transport vehicle may reposition the jacks 130, 140 and the tail hold 150.

In exemplary form, the jacks 130, 140 and tail hold 150 may be manually, automatically, or semi-automatically repositioned. Presuming the jacks 130, 140 are extended and the tail hold 150 is pivoted toward the ground, and the operator desires to raise the jacks to decrease the overall height of the device, the operator may cause the jacks and tail hold to be raised. For example, if the jacks 130, 140 and tail hold 150 are manually repositionable, the operator may manually reposition the crank handle 300 to raise the jacks and handle 410 to pivot the tail hold 150 away from the ground. Alternatively, the jacks 130, 140 and tail hold 150 may be operatively coupled to a motor or fluid reservoir (e.g., hydraulic jacks) to allow the jacks and tail hold to be repositioned semi-automatically using one or more controls allowing the operator to control the motor and/or fluid flow to direct repositioning of the jacks and tail hold. An even further alternate configuration has the jacks 130, 140 and tail hold 150 operatively coupled to a motor and/or fluid reservoir (e.g., hydraulic jacks) and a controller associated with at least one of the device 100 and the transport vehicle that brings about automatic repositioning of the jacks and tail hold when the device is initially coupled to the transport vehicle. In any event, after the jacks 130, 140 and tail hold 150 are, to the extent necessary, in the transport position, the operator of the transport vehicle repositions the device 100 into engagement with a parked freight trailer 114 ready for stabilization and/or restraint.

When repositioning the device 100 in preparation for engagement with the parked freight trailer 114, the transport vehicle operator orients the device so that the fifth wheel 110 top plate 190 is slightly lower than the bottom edge of the front of the parked freight trailer. This allows the device 100 to be repositioned under a forward portion of the freight trailer 114 so that the device couples to the parked freight trailer and, optionally, hangs therefrom. In order to hang from the freight trailer 114, the device 100 is repositioned so that the fifth wheel 110 captures and couples to the kingpin 112. More specifically, the kingpin is locked into engagement with the fifth wheel 110 via a pair of locking jaws associated with the fifth wheel. After the locking jaws are engaged partially around the kingpin 112, the device 100 is mounted to the kingpin 112 so that proximal-to-distal movement of the fifth wheel 110 with respect to the freight trailer 114 is very limited (it is simply the amount of travel provided for between the fifth wheel 110 and kingpin 112).

The jacks 130, 140 and/or tail hold 150 are repositioned from a transport position to a support and restraint position while the device 100 hangs from the parked freight trailer 114 and/or is held in position by the transport vehicle. In exemplary form, the jacks 130, 140 are extended and the tail hold 150 is pivoted toward the ground. For example, if the jacks 130, 140 and tail hold 150 are manually repositionable, the operator manually repositions the crank handle 300 to lower the jacks and handle 410 to pivot the tail hold 150 toward the ground. Alternatively, the jacks 130, 140 and tail hold 150 may be operatively coupled to a motor or fluid reservoir (e.g., hydraulic jacks) to allow the jacks and tail hold to be repositioned semi-automatically using one or more controls allowing the operator to control the motor and/or fluid flow to direct repositioning of the jacks and tail hold. An even further alternate configuration has the jacks 130, 140 and tail hold 150 operatively coupled to a motor and/or fluid reservoir (e.g., hydraulic jacks) and a controller associated with at least one of the device 100 and the transport vehicle that brings about automatic repositioning of the jacks and tail hold when the device is decoupled from the transport vehicle.

In any event, the jacks 130, 140 and tail hold 150 are repositioned so that the jacks assume at least partial weight bearing responsibility for the forward portion of the parked freight trailer, whereas the tail hold is repositioned so that the bar 370 engages the ground mount. More specifically, the jacks 130, 140 are extended so that the ground pad 340 of at least one jack contacts the ground and at least one of the jacks is operative to create a wedge between the ground and the underside of the freight trailer to assume a load bearing function. In exemplary form, the jacks 130, 140 may be extended so that the entire load bearing function for the forward portion of the parked freight trailer is borne by the jacks. This entire load bearing function may coincide with the landing gear of the parked freight trailer 114 being lifted off the ground. Though not necessary, the operator may choose to raise the landing gear of the parked freight trailer 114 as part of having the jacks 130, 140 assuming the entire load bearing function. In the context of the tail hold 150, the tail hold is repositioned to lower the bar 370 proximate the ground mount 360. By way of example, the ground mount 360 includes a number of slotted and angled grooves that is each sized to receive the bar 370. As the bar 370 is lowered to contact the ground mount 360, the play associated with the bar 370 allows the bar to self-orient itself or be manually re-oriented to align with and be received within one of the grooves of the ground mount. Once the bar 370 is received within one of the grooves, and the device 100 coupled to the parked freight trailer 114, the tail hold 150—ground mount 360 engagement operates to retard significant motion of the parked freight trailer with respect to the ground mount (and with respect to an adjacent loading dock). Before, during, or after deployment of the jacks 130, 140 and tail hold 150, the transport vehicle may be disengaged from the device 100 and utilized to position other devices under other parked freight trailers 114.

By way of example, cargo should not be loaded onto or unloaded from the parked freight trailer 114 without the device 100 being correctly positioned underneath the parked freight trailer and a loading dock worker verifying the same. The individual openings of a loading dock typically coincide in size with the opening at the rear of the parked freight trailer 114. When the freight trailer is parked at a loading dock, dock workers are unable to firsthand view the front of the parked freight trailer to ascertain the position and status of trailer stabilizing device 100. Consequently, video cameras 440 and monitors 450 may be utilized in order to inform personnel working within a loading dock that the trailer stabilizing device 100 is properly in position to restrain and/or support the freight trailer 114. By way of example, one or more video cameras 440 positioned on the exterior of the loading dock are communicatively coupled to one or more displays 450 on the interior of the loading dock. The cameras 440 may generate constant visual data, sporadic visual data, and/or regular interval visual data that is communicated to the one or more visual displays 450, thereby providing visual feedback/evidence to a loading dock worker as to the presence of a device underneath the parked freight trailer 114 and the position of the device with respect to the trailer stabilizing device (whether the device is in a restraint, transportation, and/or stabilizing position). If the device 100 is not yet positioned underneath a forward end of the parked freight trailer 114 or is incorrectly positioned (e.g., the jacks 130, 140 are not extended, the tail hold 150 has not engaged the ground mount 160, the kingpin 112 is not attached to the fifth wheel 110, etc.), the dock worker utilizes the visual feedback shown on the display(s) 450 to conclude that cargo should not be loaded onto or unloaded from the parked freight trailer. Conversely, the dock worker can utilize the visual feedback shown on the display(s) 450 to discern that the device 100 is correctly positioned underneath the parked freight trailer 114 so that cargo can be loaded onto or unloaded from the parked freight trailer (e.g., the jacks 130, 140 are extended, the tail hold 150 has engaged the ground mount 160, the kingpin 112 is attached to the fifth wheel 110, etc.). Presuming the visual feedback indicates that the device is not correctly positioned underneath the parked freight trailer 114, the dock worker signals an outside worker to correctly position the device 100. Upon visual feedback that the device 100 is correctly positioned underneath the parked freight trailer 114, the dock worker may authorize and participate in unloading cargo from or loading cargo onto the parked freight trailer.

Following completion of loading and/or unloading of the parked freight trailer 114, the dock worker signals an outside worker at the loading dock to remove the device 100 in preparation for removal of the trailer from the loading dock. Upon receiving a communication to remove the device 100, an outside dock worker operates a transport vehicle (e.g., a forklift) to engage the device 100 and remove it from underneath the parked freight trailer 114. In exemplary form, a set of forks 160 associated with the transport vehicle are received within corresponding deployment tubes 170 or other fork receiving structures. By way of example, the forks 160 are received deep enough within the deployment tubes 170 so that the transport vehicle could bear the entire weight of the device 100 upon disengagement between the device and parked freight trailer 114. At a time prior to, during, or subsequent to reception of the forks 160 within the deployment tubes 170, the operator of the transport vehicle may reposition the jacks 130, 140 and the tail hold 150.

In exemplary form, the jacks 130, 140 and tail hold 150 may be manually, automatically, or semi-automatically repositioned. Presuming the jacks 130, 140 are extended and the tail hold 150 is pivoted to engage the ground mount 360, the operator raises the jacks and discontinues any engagement between the tail hold 150 and ground mount 360. In certain circumstances, the parked freight trailer 114 may have moved forward slightly so that the tail hold 150 cannot be freely moved out of engagement with the ground mount 360. In such a circumstance, the transport vehicle may need to push against the parked freight trailer and/or the device 100 to relieve pressure upon the tail hold 150 (against the ground mount 360) to allow the tail hold to be removed from the ground mount 360. For example, if the jacks 130, 140 and tail hold 150 are manually repositionable, the operator may manually reposition the crank handle 300 to raise the jacks and handle 410 to pivot the tail hold 150 away from the ground. Alternatively, the jacks 130, 140 and tail hold 150 may be operatively coupled to a motor or fluid reservoir (e.g., hydraulic jacks) to allow the jacks and tail hold to be repositioned semi-automatically using one or more controls allowing the operator to control the motor and/or fluid flow to direct repositioning of the jacks and tail hold. An even further alternate configuration has the jacks 130, 140 and tail hold 150 operatively coupled to a motor and/or fluid reservoir (e.g., hydraulic jacks) and a controller associated with at least one of the device 100 and the transport vehicle that brings about automatic repositioning of the jacks and tail hold when the device is initially coupled to the transport vehicle.

In addition to repositioning the jacks 130, 140 and the tail hold 150, the operator may cause repositioning of the fifth wheel 110 with respect to the kingpin 112. In exemplary form, the operator causes disengagement between the kingpin 112 and fifth wheel 110 by opening the pair of jaws of the fifth wheel that allow removal of the device from underneath the parked freight trailer 114. After disengagement between the fifth wheel 110 and the kingpin 112, presuming the jacks 130, 140 are no longer in a load bearing capacity and the tail hold 150 is not engaged with the ground mount 360, the operator may reposition the transport vehicle to remove the device 100 from underneath the parked freight trailer 114 by, in exemplary form, lowering the forks 160 and repositioning the transport vehicle away from a front of the parked freight trailer.

It should be noted that a controller associated with at least one of the transport vehicle or the device 100 may cause repositioning of the jacks 130, 140 and the tail hold 150 into a transport position upon coupling the transport vehicle to the device or otherwise sending an signal to the controller to reposition the jacks and tail hold in a transport position.

After removing the device 100 from underneath the parked freight trailer, the trailer is available to be removed from the loading dock by a hustler truck or over-the-road truck. Also, after removing the device 100 from underneath the parked freight trailer 114, the operator of the transport vehicle may reposition the device underneath a different parked freight trailer in order to restrain and/or stabilize the parked freight trailer prior to cargo being unloaded from or loaded onto that trailer. The process for repositioning the device 100 under a subsequent parked freight trailer would be consistent with the foregoing explanation with respect to the first parked freight trailer and, accordingly, will not be repeated in furtherance of brevity.

It should be noted that mounting and deploying the device 100 to the parked freight trailer 114 may occur without the outside dock worker ever repositioning the landing gear of the parked freight trailer. Similarly, the dismounting and removal the device 100 from underneath the parked freight trailer 114 may occur without the outside dock worker ever repositioning the landing gear of the parked freight trailer.

Figure 4:
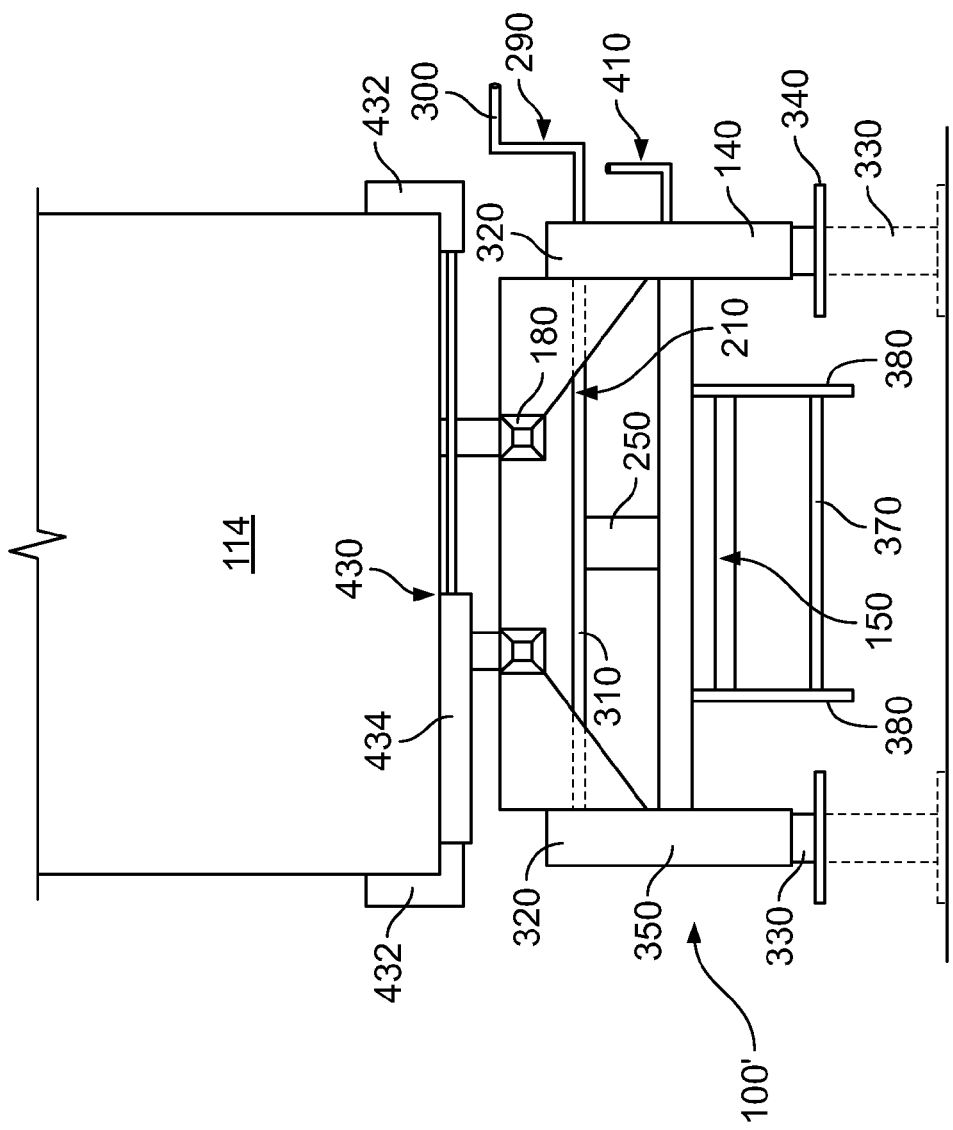
FIG. 4 is a frontal view of the first alternate exemplary trailer stabilizer being mounted to a parked freight trailer.

As shown in FIG. 4, it should be noted that in lieu of or in addition to the fifth wheel 110, an alternate exemplary device 100' may include a trailer clamp 430 that comprises repositionable arms 432 that extend laterally beyond the side edges of the parked freight trailer 114 and include a repositionable coupling 434 that allows the spacing of the repositionable arms to be changed. In this alternate exemplary embodiment, the repositionable coupling may comprise, without limitation, a hydraulic cylinder, a mechanical slide ratchet, and a pulley and winch assembly, for example. By initially setting the spacing such that the repositionable arms 432 extend laterally outward of the side edges of the parked freight trailer 114, and then directing the repositionable coupling 434 to decrease this spacing, the repositionable arms operate to sandwich the sides of the parked freight trailer and generate a sufficient clamping force to allow the device 100' to hang from the parked freight trailer. While hanging from the parked freight trailer 114 or being held in position by a transport vehicle, the jacks 130, 140 may be deployed (and raised upon loading/unloading the parked freight trailer) to a stabilizing position and the tail hold 150 may be repositioned (and raised upon loading/unloading the parked freight trailer) to a restraint position consistent with the foregoing disclosure for the first exemplary embodiment 100.

While the foregoing exemplary embodiments have been described as having manually repositionable jacks 130, 140 and a tail hold 150, it is also within the scope of the disclosure to automate the movement of these devices between a storage/transport position and a stabilized/restrained position. By way of example, the jacks 130, 140 may be electrically or hydraulically powered and, in exemplary form, receive this power from the portable vehicle used to reposition the stabilizing device 100. Moreover, the tail hold 150 may also be electrically or hydraulically repositioned, also in exemplary form robbing power from the portable vehicle used to reposition the stabilizing device.

In the foregoing exemplary embodiments, the stabilizing device 100 has been described as being repositioned by a forklift. It should be understood that a forklift is one of many portable vehicles that may be used to reposition the device. For example, the stabilizing device 100 may be transported by a transport vehicle having a three point hitch (such as a tractor) or a transport vehicle having a loader quick coupler or quick hitch attachment. In these circumstances, the deployment tubes 170 may be replaced or reconfigured to engage the applicable connection of the transport vehicle. Moreover, while the exemplary device 100, 100' has been described as being repositioned using forklift forks, forks are not the sole structure one may use to reposition the exemplary stabilizing devices. As mentioned, a three point hitch or quick coupler or quick attachment may be utilized to operatively couple the device 100, 100' to the transport vehicle. As a further alternative, one may utilize a portable jack or other lifting mechanism as the transport vehicle to raise the stabilizing device into engagement with the kingpin of the parked freight trailer.

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method of at least one of stabilizing and restraining a parked freight trailer, the method comprising:
    lifting a trailer stabilizing device to engage a parked freight trailer including locking onto a kingpin of the parked freight trailer, where at least a portion of the trailer stabilizing device is suspended above the ground occupying a footprint of the kingpin; and,
    repositioning a portion of the trailer stabilizing device to wedge the trailer stabilizing device between the ground and the parked freight trailer after lifting the trailer stabilizing device to engage the parked freight trailer and without requiring repositioning of a landing gear of the parked freight trailer.

2. The method of claim 1, wherein lifting the trailer stabilizing device to engage the parked freight trailer includes hanging a jack from the parked freight trailer so the jack is elevated above the ground in a hanging position.

3. The method of claim 2, wherein repositioning a portion of the trailer stabilizing device includes repositioning the jack from the hanging position to a ground mounting position where the jack engages the ground and assumes a load bearing capacity.

4. The method of claim 3, wherein:
    the jack comprises a plurality of jacks; and,
    repositioning the plurality of jacks from the hanging position to the ground mounting position includes at least one of automatically and manually repositioning the plurality of jacks from the hanging position to the ground mounting position.

5. The method of claim 1, wherein lifting the trailer stabilizing device to engage the parked freight trailer includes hanging a tether from the parked freight trailer so the tether is elevated above the ground in a unengaged position.

6. The method of claim 5, wherein repositioning a portion of the trailer stabilizing device includes repositioning the tether from the unengaged position to an engaged position where the tether is concurrently operatively coupled to the ground and the forward portion of the parked freight trailer.

7. The method of claim 6, wherein:
    the tether includes a tail hold; and,
    repositioning the tail hold from the unengaged position to the engaged position includes at least one of automatically and manually repositioning the tail hold.

8. A method of at least one of stabilizing and restraining a parked freight trailer, the method comprising:
    repositioning an elevated trailer stabilizing device off the ground and into engagement with a parked freight trailer including locking onto a kingpin of the parked freight trailer and suspending at least the portion of the trailer stabilizing device above the ground occupying a footprint of the kingpin, the trailer stabilizing device including a repositionable jack; and,
    repositioning the repositionable jack to wedge the stabilizing device between the parked freight trailer and the ground.

9. The method of claim 8, wherein the method does not include extension or retraction of landing gear of the parked freight trailer.

10. The method of claim 8, wherein:
    the trailer stabilizing device further includes a repositionable tail hold; and,
    the method further includes repositioning the tail hold to engage a ground mount.

11. The method of claim 10, wherein the method does not include extension or retraction of landing gear of the parked freight trailer.

12. The method of claim 8, wherein:
    the trailer stabilizing device further includes a repositionable tail hold; and,
    repositioning the trailer stabilizing device into engagement with a parked freight trailer include moving the tail hold across the ground.

13. The method of claim 8, wherein repositioning the elevated trailer stabilizing device into engagement with the parked freight trailer includes utilizing a forklift to reposition the elevated trailer stabilizing device.

14. The method of claim 8, wherein:
the trailer stabilizing device further includes a repositionable tail hold; and,
the repositionable tail hold includes a metal frame repositionable with respect to the repositionable jack.

15. The method of claim 8 further comprising at least maintaining a height of forward portion of the parked freight trailer after repositioning the repositionable jack to wedge the stabilizing device between the parked freight trailer and the ground.

16. The method of claim 8, wherein repositioning the elevated trailer stabilizing device into engagement with the parked freight trailer includes utilizing pallet forks to reposition the elevated trailer stabilizing device.

17. A method of at least one of stabilizing and restraining a parked freight trailer, the method comprising:
hanging a trailer stabilizing device from a forward aspect of a parked freight trailer;
repositioning a jack of the trailer stabilizing device to wedge the trailer stabilizing device between the parked freight trailer and the ground without requiring repositioning of a landing gear of the parked freight trailer; and
repositioning a tether of the trailer stabilizing device to engage a ground cleat.

18. The method of claim 17, wherein repositioning the tether to engage the ground cleat includes repositioning the tether from the unengaged position to an engaged position, where the engaged position is configured to place the tether in a tension between the ground cleat and the parked freight trailer.

19. The method of claim 18, wherein:
the tether includes a rigid tail hold; and,
repositioning the tail hold from the unengaged position to the engaged position includes at least one of automatically and manually repositioning the tail hold.

20. The method of claim 17, wherein hanging the trailer stabilizing device from the forward aspect of the parked freight trailer includes coupling and suspending the trailer stabilizing device from a kingpin of the parked freight trailer.

21. The method of claim 17, wherein repositioning the jack of the trailer stabilizing device to wedge the trailer stabilizing device between the parked freight trailer occurs as the landing gear of the parked freight trailer are not repositioned.

22. The method of claim 17, wherein repositioning the jack of the trailer stabilizing device to wedge the trailer stabilizing device between the parked freight trailer includes reducing a load of the parked freight trailer borne by the landing gear.

23. The method of claim 17, wherein repositioning the jack of the trailer stabilizing device to wedge the trailer stabilizing device between the parked freight trailer includes sharing a load of the parked freight trailer between the landing gear and the jack.

24. The method of claim 17, further comprising:
using a video camera to generate video images depicted on a display located inside a loading dock to confirm a position of the trailer stabilizing device.

25. The method of claim 24, wherein the video camera is located outside of the loading dock.

26. The method of claim 1, further comprising:
using a video camera to generate video images depicted on a display located inside a loading dock to confirm a position of the trailer stabilizing device.

27. The method of claim 8, further comprising:
using a video camera to generate video images depicted on a display located inside a loading dock to confirm a position of the trailer stabilizing device.

* * * * *